United States Patent
Kujime

(10) Patent No.: US 10,518,592 B2
(45) Date of Patent: Dec. 31, 2019

(54) PNEUMATIC TIRE

(71) Applicant: SUMITOMO RUBBER INDUSTRIES, LTD., Kobe-shi, Hyogo (JP)

(72) Inventor: Tomoyuki Kujime, Kobe (JP)

(73) Assignee: SUMITOMO RUBBER INDUSTRIES, LTD., Kobe-shi, Hyogo (JP)

( * ) Notice: Subject to any disclaimer, the term of this patent is extended or adjusted under 35 U.S.C. 154(b) by 556 days.

(21) Appl. No.: 15/302,203

(22) PCT Filed: Apr. 15, 2015

(86) PCT No.: PCT/JP2015/061537
§ 371 (c)(1),
(2) Date: Oct. 6, 2016

(87) PCT Pub. No.: WO2015/166805
PCT Pub. Date: Nov. 5, 2015

(65) Prior Publication Data
US 2017/0036491 A1 Feb. 9, 2017

(30) Foreign Application Priority Data

Apr. 28, 2014 (JP) .................. 2014-093034
Apr. 28, 2014 (JP) .................. 2014-093039

(51) Int. Cl.
*B60C 15/04* (2006.01)
*B60C 15/06* (2006.01)
(Continued)

(52) U.S. Cl.
CPC ...... *B60C 15/0603* (2013.01); *B60C 15/0018* (2013.01); *B60C 15/05* (2013.01);
(Continued)

(58) Field of Classification Search
CPC . B60C 15/0018; B60C 15/0603; B60C 15/05; B60C 15/0607; B60C 2015/0696;
(Continued)

(56) References Cited

U.S. PATENT DOCUMENTS 6,109,321 A    8/2000  Costa Pereira et al.
6,598,642 B1   7/2003  Hirai
(Continued)

FOREIGN PATENT DOCUMENTS

DE    102010017270 A1 * 12/2011 ............. B60C 15/05
JP       04254207 A  *  9/1992
(Continued)

OTHER PUBLICATIONS

Machine Translation: JP-04254207-A; Yoshida, Yujiro; (Year: 2019).*
(Continued)

*Primary Examiner* — Kendra Ly
(74) *Attorney, Agent, or Firm* — Birch, Stewart, Kolasch & Birch, LLP

(57) ABSTRACT

A pneumatic tire comprises a carcass formed of a carcass ply extending between a pair of bead portions in a toroidal shape, and a bead core disposed in a respective one of the bead portions, the bead core comprising an axially inner core and an axially outer core respectively disposed on an axially inner side and the axially outer side of the carcass ply. The bead portion comprises an inner bead apex rubber extending radially outward from the inner core, and an outer bead apex rubber extending radially outward from the outer core. An outer apex height Ho from a bead base line to a outer end of the outer bead apex rubber is in a range of from 120% to 150% of an inner apex height Hi from the bead base line to the outer end of the inner bead apex rubber.

13 Claims, 6 Drawing Sheets

(51) Int. Cl.
  *B60C 17/04* (2006.01)
  *B60C 17/00* (2006.01)
  *B60C 15/00* (2006.01)
  *B60C 15/05* (2006.01)

(52) U.S. Cl.
  CPC ...... *B60C 15/0607* (2013.01); *B60C 17/0009* (2013.01); *B60C 15/06* (2013.01); *B60C 2015/046* (2013.01); *B60C 2015/061* (2013.01); *B60C 2015/0614* (2013.01); *B60C 2015/0696* (2013.01); *B60C 2017/0072* (2013.01)

(58) Field of Classification Search
  CPC ........ B60C 2015/061; B60C 2015/048; B60C 15/06; B60C 15/04
  USPC .................................. 152/539–547, 516–522
  See application file for complete search history.

(56) References Cited

U.S. PATENT DOCUMENTS

| | | | | |
|---|---|---|---|---|
| 2002/0170647 | A1* | 11/2002 | Pereira | B60C 15/0018 152/451 |
| 2003/0062107 | A1 | 4/2003 | Leblond et al. | |
| 2004/0112498 | A1* | 6/2004 | Potin | B60C 15/0018 152/543 |
| 2007/0163696 | A1* | 7/2007 | Iida | B60C 15/0081 152/545 |
| 2008/0066843 | A1* | 3/2008 | Alvarez | B60C 9/0007 152/451 |
| 2008/0318077 | A1 | 12/2008 | Barguet et al. | |
| 2014/0083591 | A1* | 3/2014 | Ito | B60C 15/04 152/541 |

FOREIGN PATENT DOCUMENTS

| | | | | | |
|---|---|---|---|---|---|
| JP | 11245635 | A | * | 9/1999 | ......... B60C 17/0009 |
| JP | 2001-97010 | A | | 4/2001 | |
| JP | 2001-526607 | A | | 12/2001 | |
| JP | 2014-51232 | A | | 12/2002 | |
| JP | 2003-514706 | A | | 4/2003 | |
| JP | 2006347363 | A | * | 12/2006 | ......... B29D 30/165 |
| JP | 2007-537364 | A | | 12/2007 | |
| JP | 2010058671 | A | * | 3/2010 | |
| JP | 2012-126299 | A | | 7/2012 | |
| JP | 2013-184653 | A | | 9/2013 | |
| JP | 2014-61839 | A | | 4/2014 | |
| KR | 20130022267 | A | * | 3/2013 | |
| WO | WO-0230690 | A1 | * | 4/2002 | ......... B60C 15/0018 |
| WO | WO 02/096672 | A2 | | 12/2002 | |
| WO | WO 2002/096672 | A3 | | 12/2002 | |
| WO | WO-02096672 | A2 | * | 12/2002 | ......... B60C 1/0025 |
| WO | WO 2005/113259 | A | | 12/2005 | |
| WO | WO 2014-030424 | A1 | | 2/2014 | |

OTHER PUBLICATIONS

Machine Translation:JP-2006347363-A; Ogawa, Yuichiro; (Year: 2019).*
Machine Translation: KR-20130022267-A; Heo Joon Yong; (Year: 2019).*
Machine Translation: JP-2010058671-A; Shimomura, Kazuo; (Year: 2019).*
Machine Translation: DE-102010017270-A1; Thomforde Claudia; (Year: 2019).*
Machine Translation: JP-11245635-A; Shimada, Taku; (Year: 2019).*
Partial Supplementary European Search Report dated Dec. 13, 2017, in European Patent Application No. 15785757.4.
Extended European Search Report dated May 24, 2018, in European Patent Application No. 15785757.4.
International Search Report, issued in PCT/JP2015/061537 (PCT/ISA/210), dated Jul. 7, 2015.
Written Opinion of the International Searching Authority, issued in PCT/JP2015/061537 (PCT/ISA/237), dated Jul. 7, 2015.

* cited by examiner

PNEUMATIC TIRE

TECHNICAL FIELD

The present invention relates to a pneumatic tire having an excellent durability of a bead portion.

BACKGROUND ART

Patent Document 1 discloses a pneumatic tire including a carcass formed of a carcass ply extending between a pair of bead portions in a toroidal shape, and a bead core disposed in a respective one of the bead portions and comprising an axially inner core and an axially outer core respectively disposed on an axially inner side and an axially outer side of the carcass ply. In the pneumatic tire, an inner bead apex rubber is disposed radially outward of the inner core, and an outer bead apex rubber is disposed radially outward of the outer core.

RELATED ART DOCUMENTS

Patent Documents

Patent Document 1: Japanese unexamined Patent Application Publication No. 2012-126299

In the above-mentioned pneumatic tire, an outer end of the inner bead apex rubber and an outer end of the outer bead apex rubber are at closely. Therefore, in the vicinity of these outer ends, stress is likely to concentrate due to acute change in rigidity. Such stress concentration causes decrease in durability of the bead portion.

SUMMARY OF THE INVENTION

Technical Problem

The present invention has been devised in view of the circumstances described above. The main object of the present invention is to provide a pneumatic tire having an excellent durability of the bead portion.

Solution to Problem

The present invention provides a pneumatic tire including a carcass formed of a carcass ply extending between a pair of bead portions in a toroidal shape, a bead core disposed in a respective one of the bead portions and comprising an axially inner core and an axially outer core respectively disposed on an axially inner side and the axially outer side of the carcass ply, an inner bead apex rubber extending radially outward from the inner core in a tapered shape, an outer bead apex rubber extending radially outward from the outer core in a tapered shape, and an outer apex height Ho, which is a radial distance from a bead base line to a radially outer end of the outer bead apex rubber, being in a range of from 120% to 150% of an inner apex height Hi, which is a radial distance from the bead base line to the radially outer end of the inner bead apex rubber.

In another aspect of the present invention, the pneumatic tire may further include a side reinforcing rubber layer having a substantially crescentic cross-sectional shape on an inner side of the carcass in a sidewall region.

In another aspect of the present invention, the pneumatic tire may further include a clinch rubber disposed on an axially outer side of the outer bead apex rubber of one of the bead portion to form an outer surface of the bead portion, and a radially outer end of the clinch rubber may be located radially outside an outer end of the outer bead apex rubber.

In another aspect of the present invention, the pneumatic tire may further include a sidewall rubber disposed axially outward of the carcass and the clinch rubber to form an outer surface of a sidewall portion, and a thickness Ta of the side reinforcing rubber layer at a radially inner end of the sidewall rubber may be in a range of from 17.5% to 37.5% of a thickness Tz of the bead portion at the inner end of the sidewall rubber.

In another aspect of the present invention, a thickness Tb of the outer bead apex rubber at the inner end of the sidewall rubber may be not more than 20% of the thickness Tz of the bead portion.

In another aspect of the present invention, a thickness Tc of the clinch rubber at the inner end of the sidewall rubber may be in a range of from 36% to 56% of the thickness Tz of the bead portion.

In another aspect of the present invention, a thickness Td of the inner bead apex rubber at the inner end of the sidewall rubber may be not more than 10% of the thickness Tz of the bead portion.

In another aspect of the present invention, each of the inner core and the outer core may be formed by winding a bead wire spirally in a circumferential direction of the tire more than once, and in at least one of the bead portions, the number of turns of the bead wire of the inner core may be larger than the number of turns of the bead wire of the outer core.

In another aspect of the present invention, the inner core includes a first inner core disposed on a carcass ply side, and a second inner core disposed on an axially inward of the first inner core, and the number of turns of the bead wire of the second inner core may be larger than the number of turns of the bead wire of the first inner core.

In another aspect of the present invention, an outer diameter of the second inner core may be larger than an outer diameter of the first inner core.

In another aspect of the present invention, an inner diameter of the second inner core may be smaller than an inner diameter of the first inner core.

In another aspect of the present invention, the second inner core may include a main portion extending along an axially inner side of the first inner core, an auxiliary portion extending along the carcass ply without intervening the first inner core, and a bent joint portion connecting the main portion to the auxiliary portion so as to cover a radially outer surface of the first inner core.

In another aspect of the present invention, the outer core includes a first outer core disposed on a carcass ply side and a second outer core disposed on axially outward of the first outer core, and the number of turns of the bead wire of the first outer core may be larger than the number of turns of the bead wire of the second outer core.

In another aspect of the present invention, an outer diameter of the first outer core may be larger than an outer diameter of the second outer core.

In another aspect of the present invention, an inner diameter of the first outer core may be smaller than an inner diameter of the second outer core.

In another aspect of the present invention, an axial distance from an axially inner end of the inner core to a tire inner cavity surface may be not less than 2.5 mm.

In another aspect of the present invention, the carcass ply may terminate radially inward of the bead core.

Advantageous Effect of Invention

The pneumatic tire according to the present invention includes a bead core including an axially inner core and an axially outer core respectively disposed on an axially inner side and the axially outer side of the carcass ply, and an inner bead apex rubber and an outer bead apex rubber extending radially outward from the inner core and the outer core in a tapered shape, respectively. Since an outer apex height Ho is in a range of from 120% to 150% of an inner apex height Hi, an outer end of the inner bead apex rubber and an outer end of the outer bead apex rubber are located away from each other to reduce stress concentration thereto. Furthermore, since the outer apex height Ho is larger than the inner apex height Hi, heat of the outer bead apex rubber during running is rapidly released from an outer surface of the bead portion and a rim flange. On the other hand, since the volume of the inner apex rubber having difficulty of the heat dissipation is suppressed by reducing the inner apex height Hi, the heat generation of the bead portion is suppressed. This improves durability of the bead portion.

DESCRIPTION OF EMBODIMENTS

Hereinafter, an embodiment of the present invention will be described with reference to the accompanying drawings.

First Embodiment

Figure 1:
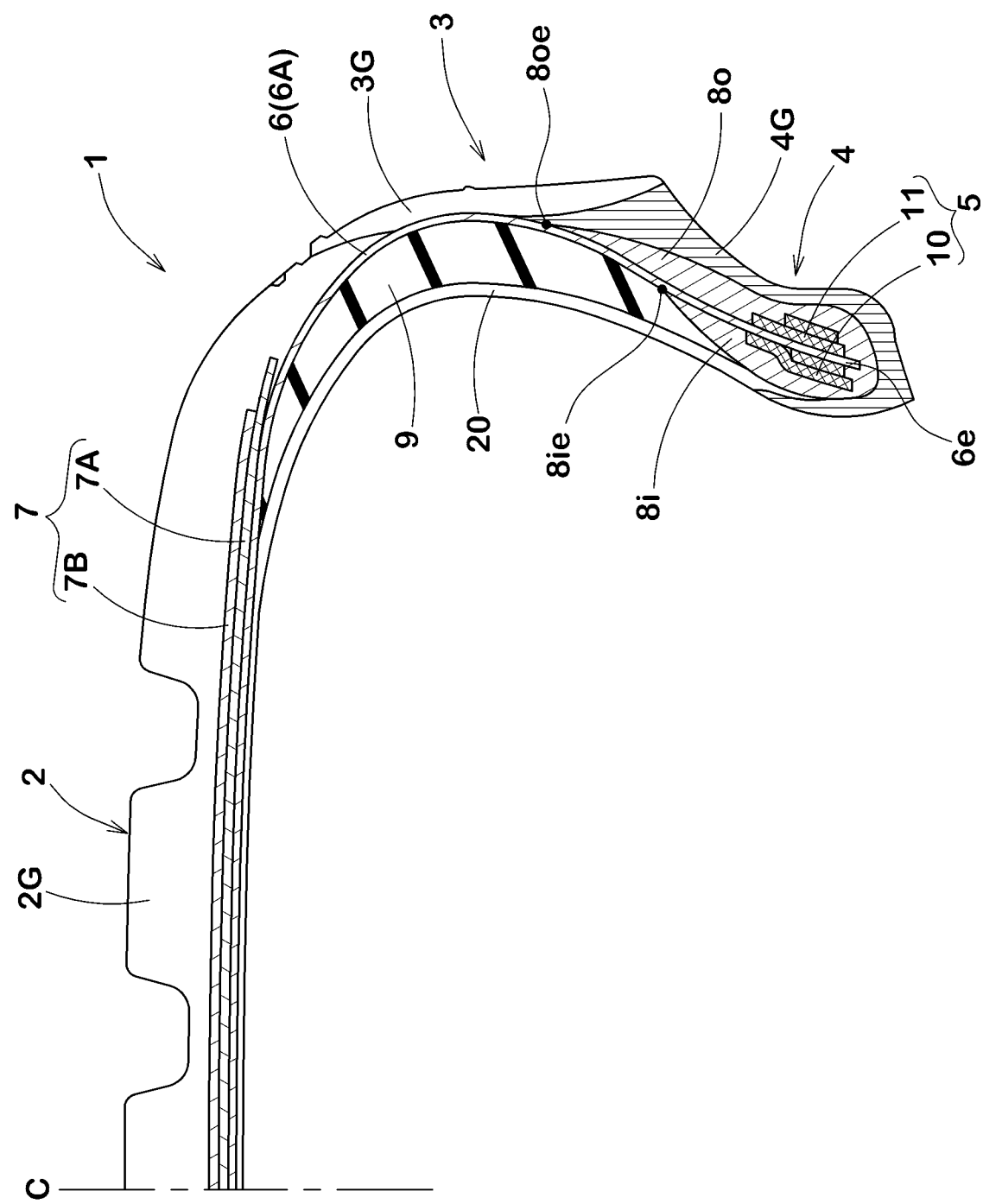
FIG. 1 is a cross-sectional view of a pneumatic tire illustrating an embodiment of the present invention.

FIG. 1 is a cross-sectional view of a right half of a pneumatic tire 1 (hereinafter, simply referred to as "tire") according to the present embodiment. The pneumatic tire 1 includes a tread portion 2, a pair of sidewall portions 3, a pair of bead portions 4 with a respective one of bead cores 5, a carcass 6 and a belt layer 7 disposed radially outside the carcass 6. In this embodiment, the pneumatic tire 1 is shown as a passenger car tire.

The pneumatic tire 1 illustrates in FIG. 1 is under a standard state in which the tire is mounted on a standard wheel rim (not illustrated) and is inflated to a standard internal pressure, but is loaded with no load.

The "standard wheel rim" is a wheel rim approved for each tire by standard organizations on which the tire is based. For example, the standard is a standard rim in the case of JATMA, a "Design Rim" in the case of TRA, and a "Measuring Rim" in the case of ETRTO. Also the "standard internal pressure" means an air pressure approved for each tire by the standard organizations. For example, the standard internal pressure is the maximum air pressure in JATMA, the maximum value described in a table "TIRE LOAD LIMITS AT VARIOUS COLD INFLATION PRESSURES" in the case of TRA, and the "INFLATION PRESSURE" in the case of ETRTO. When the tire is for a passenger car, the standard internal pressure is 180 KPa.

The carcass 6 includes a carcass ply 6A extending between the pair of the bead portions 4 and 4 in the toroidal shape. The carcass ply 6A includes a carcass cord extending between the bead cores 5 of the bead portions 4 through the tread portion 2 and the sidewall portions 3. In the carcass ply 6A, for example, the carcass cord made of organic fiber such as aromatic polyamide or rayon is arranged at an angle of from 75 to 90 degrees with respect to the tire equator C. The carcass ply 6A according to the present embodiment extends across between the pair of bead portions 4 and 4 in the toroidal shape and the radially inner end portions 6e terminate without being turned up around the bead cores 5.

The belt layer 7 includes at least two plies 7A and 7B, radially inner and outer belt plies in the present embodiment. Each of the belt plies 7A and 7B includes a highly elastic belt cord inclined at an angle of from 15 to 40 degrees with respect to the tire equator C and made of aramid, rayon or the like, for example. The belt plies 7A and 7B are disposed so that each belt cord intersects with each other. A band layer which is wound spirally in the tire circumferential direction may be disposed radially outward of the belt layer 7.

The bead cores 5 are disposed in the bead portions 4. Each of the bead core 5 of the present embodiment includes an inner core 10 disposed on an axially inner side of the inner end portion 6e of the carcass ply 6A, and an outer core 11 disposed on an axially outer side of the inner end portion 6e. Note that the inner end portion 6e of the carcass ply 6A is a portion which extends in the bead portion 4 from the end of the carcass ply 6A.

On a radially outer side of the inner core 10, an inner bead apex rubber 8i is disposed. The inner bead apex rubber 8i extends radially outward from the inner core 10 in a tapered shape so as to have an outer end 8ie.

On a radially outer side of the outer core 11, an outer bead apex rubber 8o is disposed. The outer bead apex rubber 8o extends radially outward from the outer core 11 in a tapered shape so as to have an outer end 8oe.

The inner bead apex rubber 8i and the outer bead apex rubber 8o according to the present embodiment are connected to each other on the radially inner side of the inner core 10 and the outer core 11 so as to cover the inner end of the carcass ply 6A.

To increase sufficiently rigidity of the bead portion 4, the inner bead apex rubber 8i and the outer bead apex rubber 8o are preferably formed of a rubber composition having complex elastic modulus E* of from 5 to 20 MPa, for example. In this specification, the complex elastic modulus E* refers to the values measured using a viscoelastic spectrometer under conditions of a temperature 70 degrees C., a frequency of 10 Hz, an initial elongation strain of 10%, and an amplitude of ±1% of dynamic strain.

Figure 2:
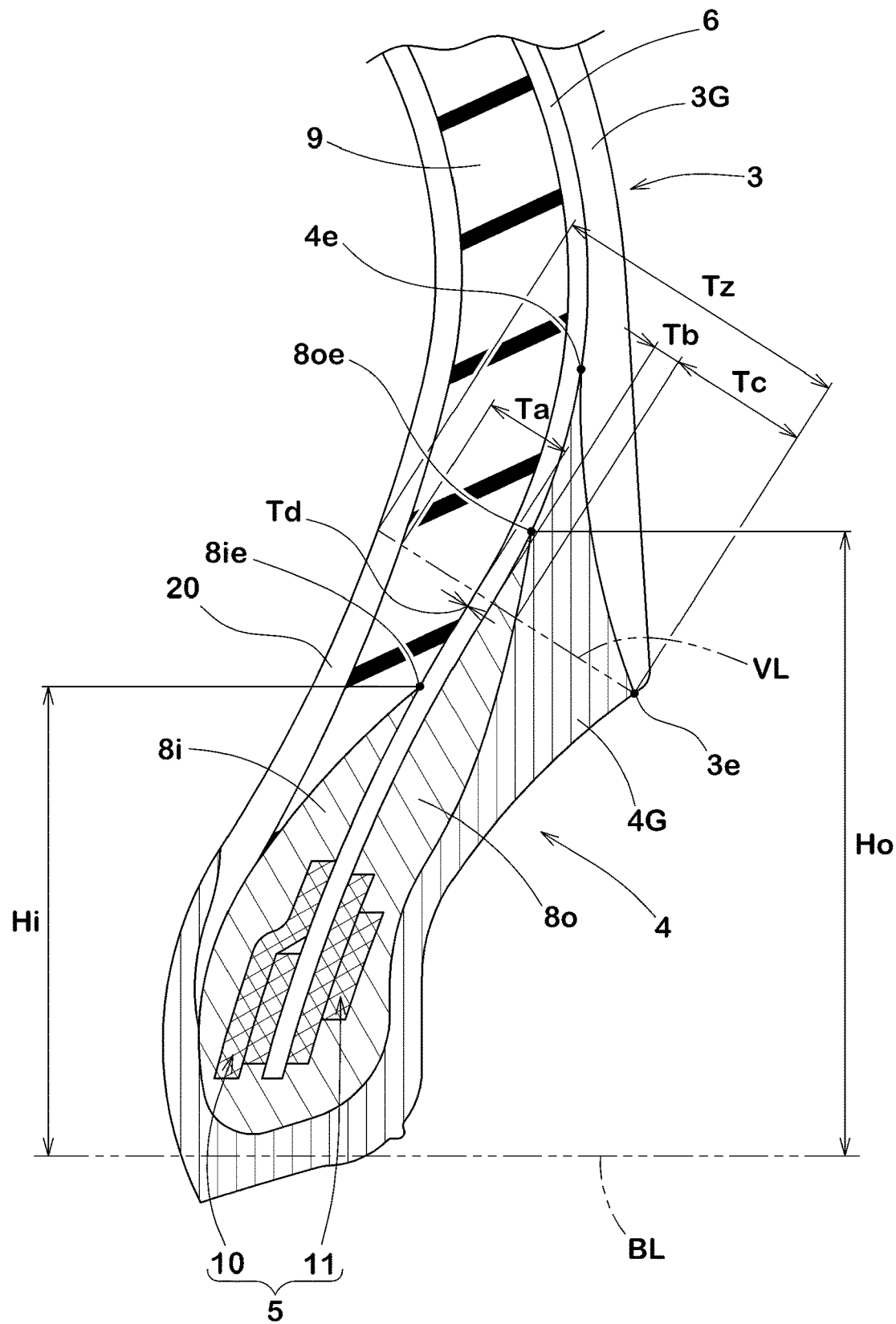
FIG. 2 is an enlarged cross-sectional view of a bead portion of FIG. 1.

FIG. 2 is an enlarged view of the bead portion 4 of the pneumatic tire 1. In the pneumatic tire of the present embodiment, the outer apex height Ho is preferably in a range of from 120% to 150% of the inner apex height Hi. The outer apex height Ho is a radial distance from a bead base line BL to the radially outer end 8oe of the outer bead apex rubber 8o. The inner apex height Hi is a radial distance from the bead base line BL to the outer end 8ie of the inner bead apex rubber 8i.

In the tire of the present embodiment, since the inner apex height Hi and the outer apex height Ho are properly set, their locations of outer ends 8ie and 8oe are distributed, and the stress concentration is softened. Further, since the high outer apex height Ho is larger than the inner apex height Hi, heat produced by the outer bead apex rubber is rapidly released from the outer surface of the bead portion 4 and the rim flange. On the other hand, since the volume of the inner bead apex rubber 8i having difficulty in heat dissipation is suppressed by reducing the inner apex height Hi, the heat generation of the bead portion 4 is suppressed. This improves the durability of the bead portion 4.

When the outer apex height Ho is less than 120% of the inner apex height Hi, the outer end 8ie of the inner bead apex rubber 8i and the outer end 8oe of the outer bead apex rubber 8o are apt to approach. Thus, in the vicinity of the outer end 8ie and outer end 8oe, the rigidity changes suddenly and stress tends to concentrate thereto. Accordingly, the durability of the bead portion 4 may lower.

On the other hand, when the outer apex height Ho is more than 150% of the inner apex height Hi, the outer bead apex rubber 8o excessively produces heat, and the durability of the bead portion 4 may lower.

To further enhance an operational effect described above, the complex elastic modulus $E^*$ of the inner bead apex rubber 8i may be different from the complex elastic modulus $E^*$ of the outer bead apex rubber 8o. For example, the outer bead apex rubber 8o having the complex elastic modulus $E^*$ larger than the complex elastic modulus $E^*$ of the inner bead apex rubber 8i may be employed. In this case, it is possible to increase the rigidity of the bead portion 4 in a vicinity of the rim flange.

Since the pneumatic tire 1 of the present embodiment includes a side reinforcing rubber layer 9 having a substantially crescentic cross-sectional shape on an inner side of the carcass 6 in a sidewall region, the pneumatic tire 1 is a run-flat tire being capable of running at a puncture state. The side reinforcing rubber layer 9 enhances flexural rigidity of the sidewall portion 3. Thus, a vertical deflection of the tire at the time of puncture is limited, and the run-flat durability can be ensured high. Note that the side reinforcing rubber layer 9 is not essential in the present invention.

In this embodiment, the side reinforcing rubber layer 9 is formed of the rubber composition having the complex elastic modulus $E^*$ of from 6 to 12 MPa. Such rubber composition provides the side reinforcing rubber layer 9 having a high reinforcing effect at a small thickness. Thus, while further suppressing the increase in weight of the tire, the tire with sufficient run-flat durability can be obtained. When the complex elastic modulus $E^*$ of the side reinforcing rubber layer 9 is less than 6 MPa, the tire weight increases since a large thickness is required to ensure the flexural rigidity of the sidewall portion 3. On the other hand, when the complex elastic modulus $E^*$ of the side reinforcing rubber layer 9 exceeds 12 MPa, the flexural rigidity of the sidewall portion 3 is excessively high, and thus a ride comfort during ordinal running with a normal internal pressure possibly declines.

In the present embodiment, since the inner apex height Hi is set to lower than the outer apex height Ho, the disposition region of the side reinforcing rubber layer 9 in the bead portion 4 is possibly enlarged while maintaining the weight of the tire. This can improve the rigidity from the bead portion 4 to the sidewall portion 3 and suppress the heat generation in the inside of the carcass 6.

Referring back to FIG. 1, on the outside of the carcass 6, a tread rubber 2G forming a ground contact surface, a sidewall rubber 3G forming an outer surface of each sidewall portion 3, and a clinch rubber 4G forming each outer surface of the bead portion 4 and contacting with a rim seat surface and the like are arranged. The tread rubber 2G is disposed on a radially outer side of the belt layer 7.

The sidewall rubber 3G is disposed on an axially outer side of the carcass 6 and the clinch rubber 4G. The sidewall rubber 3G is preferably formed of a rubber composition having a complex elastic modulus $E^*$ in a range of from 1 to 10 MPa as a softer rubber than the bead apex rubbers 8i and 8o.

The clinch rubber 4G is disposed on an axially outer side of the outer bead apex rubber 8o and forms the outer surface of the bead portion. The clinch rubber 4G is also disposed radially inward of the outer bead apex rubber 8o and the inner bead apex rubber 8i as well as axially inner side of the inner bead apex rubber 8i. To prevent wear or damage due to contact with the rim on the bead outer surface of the bead portion 4, the clinch rubber 4G is preferably formed of a rubber composition having the complex elastic modulus $E^*$ of from 3 to 20 MPa.

As illustrated in FIG. 2, the radially outer end 4e of the clinch rubber 4G is located radially outward of the outer end 8oe of the outer bead apex rubber 8o. As a result, the stiffness is gradually reduced from the outer end 8ie of the inner bead apex rubber 8i to the radially outer end 4e of the clinch rubber 4G. Therefore, a local concentration of stress is suppressed, and the durability of the bead portion 4 is improved.

An inner liner rubber 20 is disposed inside the carcass 6 and the side reinforcing rubber layer 9. The inner liner rubber 20 is formed of rubber excelling in air non-permeable in order to keep the tire pressure.

In the present embodiment, in a region where the bead portion 4 has the largest distortion, a thickness Ta of the side reinforcing rubber layer 9, a thickness Tb of the outer bead apex rubber 8o, a thickness Tc of the clinch rubber, and a thickness Td of the inner bead apex rubber 8i are associated with a thickness Tz of the bead portion. Thus, it is possible to improve the run-flat durability and the ride comfort in the ordinal running in a good balance. The region where the bead portion 4 has the largest distortion is defined as a region on a perpendicular line VL drawn from the radially inner end 3e of the sidewall rubber 3G to the carcass 6, for example. The respective thicknesses Tz, Ta, Tb, Tc and Td are thicknesses on the perpendicular line VL (hereinafter, each thickness on the perpendicular line VL is defined as a thickness at the inner end 3e of the sidewall rubber 3G).

For example, the thickness Ta of the side reinforcing rubber layer 9 at the inner end 3e of the side wall rubber 3G is preferably in the range of from 17.5% to 37.5% of the thickness Tz of the bead portion 4 at the inner end 3e. when the thickness Ta of the side reinforcing rubber layer 9 is less than 17.5% of the thickness Tz of the bead portion 4, the vertical deflection at the run-flat running is large, and run-flat durability is possibly deteriorated. On the other hand, when the thickness Ta of the side reinforcing rubber layer 9 exceeds 37.5% of the thickness Tz of the bead portion 4, the rigidity of the sidewall portion 3 and the bead portion 4 is excessively large under inflation of the tire, and ride comfort during normal traveling tends to be deteriorated.

The thickness Tb of the outer bead apex rubber 8o at the inner end 3e of the sidewall rubber 3G is preferably not more than 20% of the thickness Tz of the bead portion 4. When the thickness Tb of the outer bead apex rubber 8o is more than 20% of the thickness Tz of the bead portion 4, the rigidity of the sidewall portion 3 and the bead portion 4 is excessively large under inflation of the tire, and ride comfort during normal traveling tends to be deteriorated.

The thickness Tc of the clinch rubber 4G at the inner end 3e of the side wall rubber 3G is preferably in a range of from 36% to 56% of the thickness Tz of the bead portion 4. When the thickness Tc of the clinch rubber 4G is less than 36% of the thickness Tz of the bead portion 4, the vertical deflection at the run-flat running is large, and the run-flat durability is possibly deteriorated. On the other hand, when the thickness Tc of the clinch rubber exceeds 56% of the thickness Tz of the bead portion 4, the rigidity of the sidewall portion 3 and the bead portion 4 is excessively large under inflation of the tire, and ride comfort during normal traveling tends to be deteriorated.

Further, the thickness Td of the inner bead apex rubber 8i at the inner end 3e of the sidewall rubber 3G is preferably not more than 10% of the thickness Tz of the bead portion 4. When the thickness Td of the inner bead apex rubber 8i is more than 10% of the thickness Tz of the bead portion 4, the rigidity between the sidewall portion 3 and the bead portion 4 is excessively large under inflation of the tire, and ride comfort during normal traveling tends to be deteriorated. In the present embodiment, the thickness Td of the inner bead apex rubber 8i at the inner end 3e of the sidewall rubber 3G is 0 mm.

Second Embodiment

Hereinafter, another embodiment of the present invention is described with reference to the accompanying drawings. In the second embodiment, like elements to the first embodiment are denoted by the same reference numerals. In explanation of the elements, the explanations in the previous embodiment are cited herein.

Figure 3:
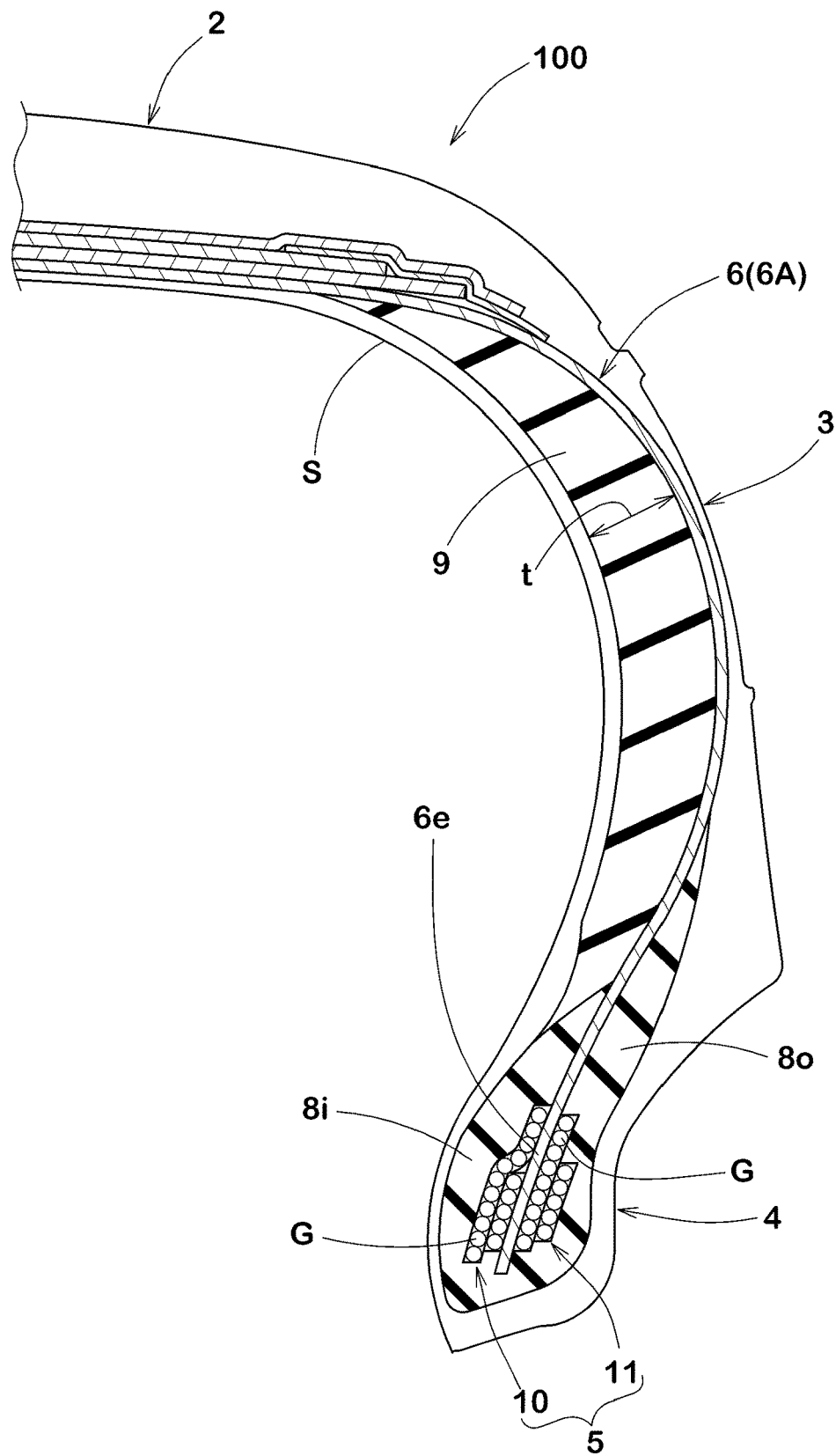
FIG. 3 is a cross-sectional view of the pneumatic tire according to another embodiment of the present invention.
Figure 4:
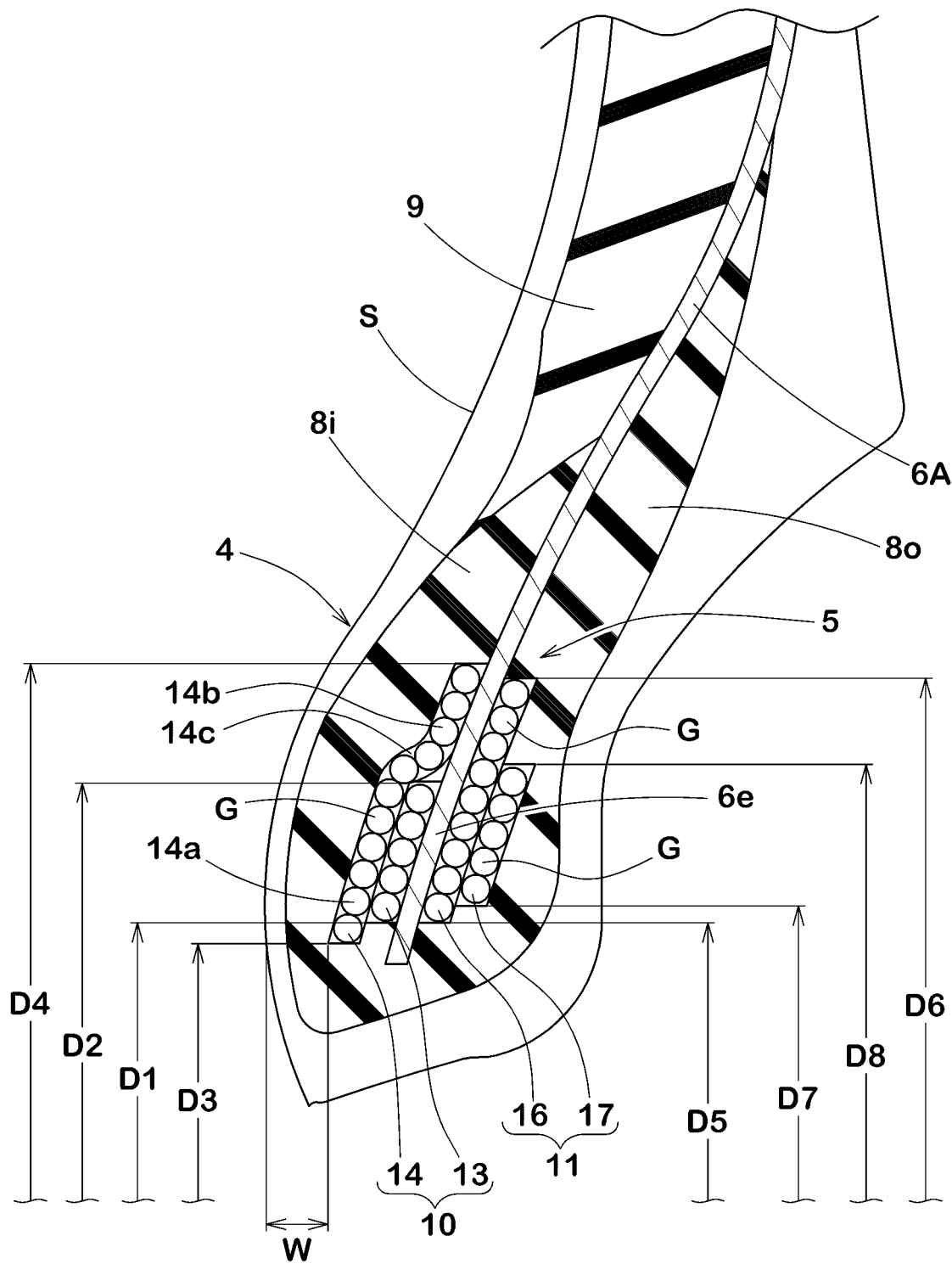
FIG. 4 is a partial enlarged view of the vicinity of the bead portion in FIG. 3.

FIG. 3 is a meridian cross-sectional view including a tire rotational axis of a pneumatic tire 100 in the standard state of the present embodiment. FIG. 4 is an enlarged cross-sectional view of an enlarged right side of the bead portion 4 of the tire 100. A left side of the tire 100 is not specifically shown but includes a similar structure to the right side. The tire 100 of the present embodiment can be suitably used as a run-flat tire for passenger cars, for example.

As illustrated in FIG. 3, the tire 100 of the present embodiment includes a carcass 6 having a carcass ply 6A extending between bead cores 5 of bead portions 4 through a tread portion 2 and sidewall portions 3, a side reinforcing rubber layer 9 disposed on an inner side of the carcass 6 of each of the sidewall portions 3, an inner bead apex rubber 8i and an outer bead apex rubber 8o disposed in each of the bead portions.

The carcass 6 of the embodiment is formed of a single carcass ply 6A. The carcass ply 6A extends in a toroidal shape between the sidewall portions 3, for example. Each of the inner end portions 6e of the carcass ply 6A is held by a respective one of the bead cores 5.

The carcass ply 6A is formed by coating a carcass cord with topping rubber, for example. The carcass cord of the present embodiment is arranged at an angle of about 90 degrees with respect to the tire circumferential direction. For the carcass cord, a metal fiber cord such as steel or an organic fiber cord such as polyester, nylon, rayon and aramid can be employed. In the present embodiment, the organic fiber cord may be preferably employed.

The side reinforcing rubber layer 9 is configured to have a substantially crescentic cross-sectional shape. The side reinforcing rubber layer 9 is preferably made of hard rubber having a JIS A-hardness of not less than 65 degrees, for example, which is harder than peripheral rubber forming the tread portion 2 and the sidewall portions 3. Such a side-reinforcing rubber layer 9 can improve the rigidity of the sidewall portions 3 and reduce a deflection under run-flat running, and it helps to improve durability during run-flat running.

As illustrated in FIG. 4, each of the bead cores 5 includes an inner core 10 disposed on an axially inner side of the carcass ply 6A, and an outer core 11 disposed on an axially outer side of the carcass ply 6A. Each of the inner end portions 6e of the carcass ply 6A is sandwiched between the inner core 10 and outer core 11. In a preferred embodiment, the carcass ply 6A terminates at a location radially inwardly of the bead core 5. Thus, the inner core 10 and the outer core 11 strongly hold the carcass ply 6A, and may prevent the carcass ply 6A from being pulled up or the like, for example.

Each of the inner core 10 and the outer core 11 is made by winding a bead wire G spirally in the circumferential direction more than once. The bead wire G may be a cord in which a plurality of filaments are twisted together or may be a monofilament, for example. In a preferred embodiment, for the bead wire G, a steel wire may be employed.

In at least one of the bead portions 4, the number of turns of the bead wire G of the inner core 10 is larger than the number of turns of the bead wire G of the outer core 11. The inner core 10 has higher compressive resistance rigidity than that of the outer core 11.

Figure 5:
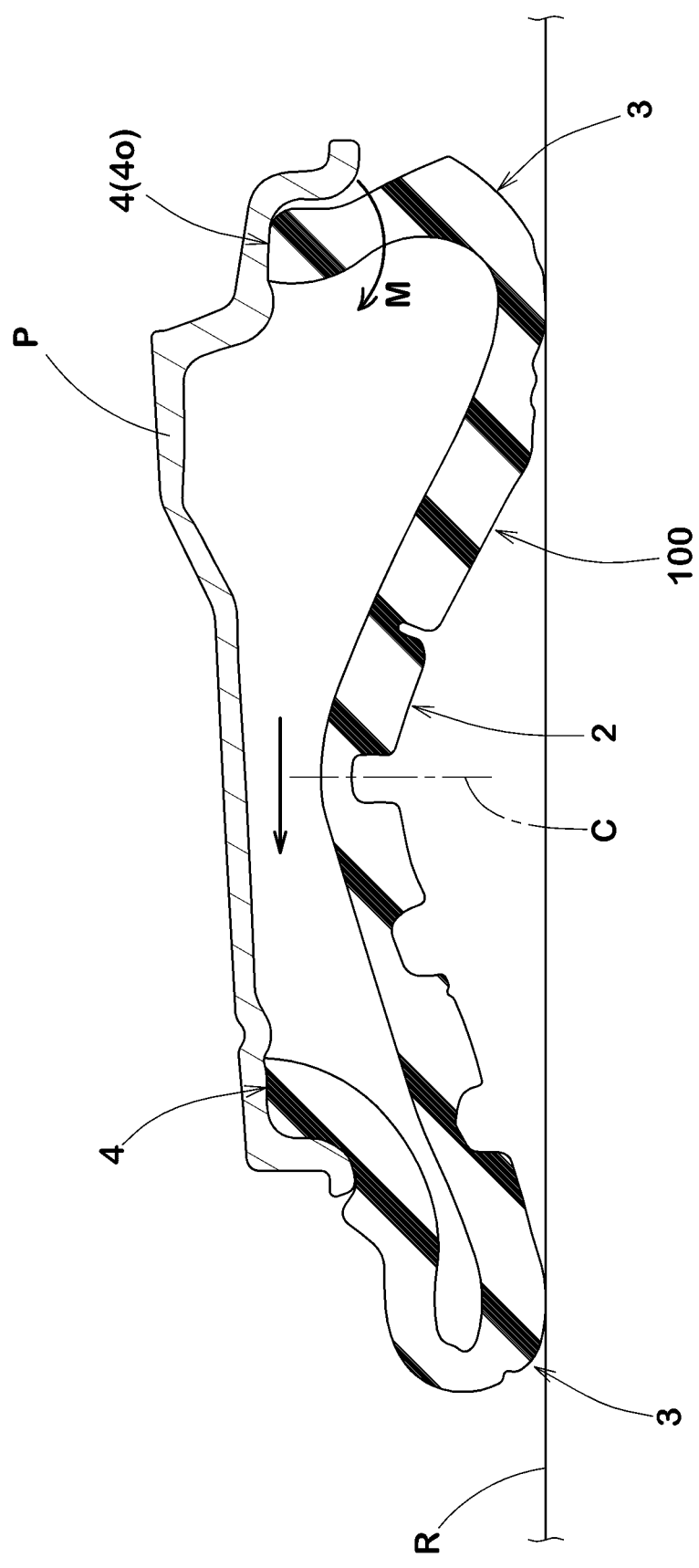
FIG. 5 is a meridian sectional view of the tire during cornering in a state where an internal pressure is lowered.
Figure 6:
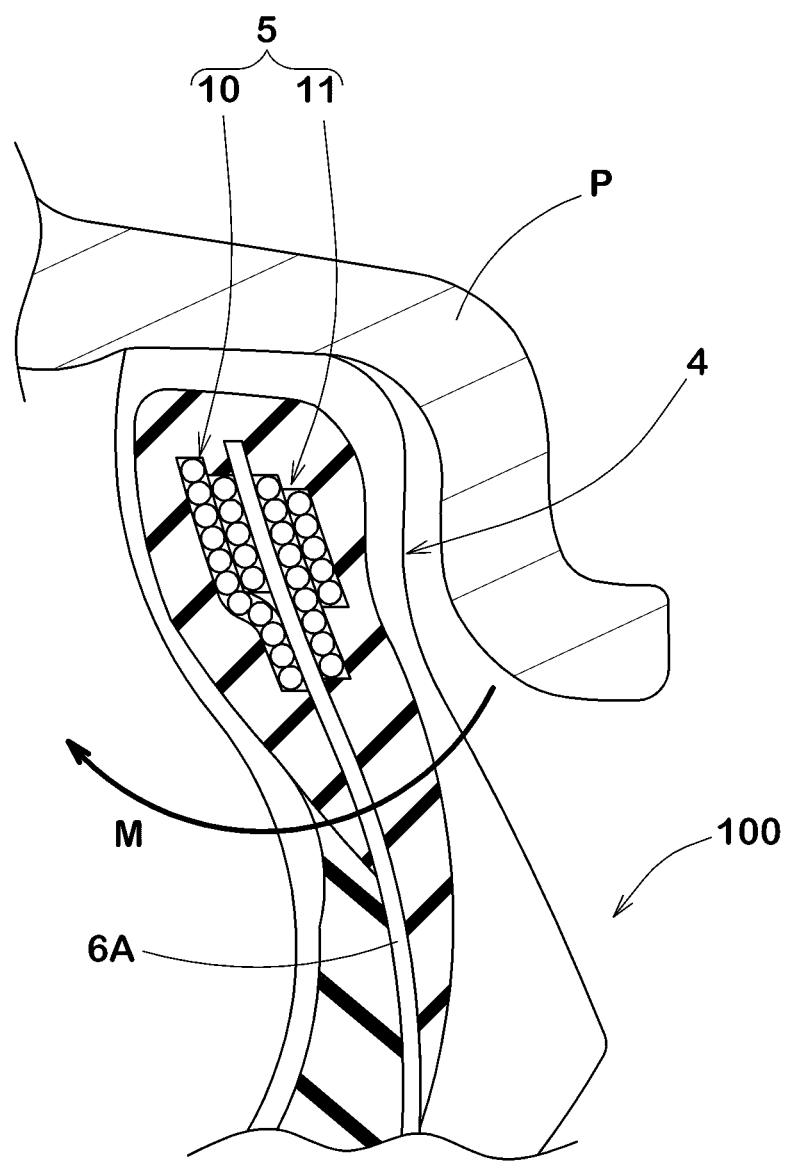
FIG. 6 is an enlarged view of the right half of the bead portion of FIG. 5.

FIGS. 5 and 6 illustrates a cornering state where an internal pressure of the tire is reduced (e.g., punctured state). During cornering, a moment M that causes to separate the bead portion 4o from a rim flange of the rim P occurs in the bead portion 4o which located outside of cornering. This moment M causes a compressive deformation of a vicinity of the inner core 10 of the bead portion 4. When the amount of compressive deformation increases, the bead core 5 may be dropped off from the rim O by rotating axially inward.

In the tire 100 of the present embodiment, since the inner core 10 has a high compressive resistance rigidity, even in a cornering state of the tire with a low internal pressure, the compressive deformation in the vicinity of the inner core 10 is suppressed so that the bead core 5 is prevented from rotating axially inwardly. Accordingly, the tire 100 of the present embodiment can exhibit an excellent rim-off resistance.

In the embodiment of FIG. 4, the inner core 10 includes a first inner core 13 on a side of the carcass ply 6A, and a second inner core 14 disposed on an axially inner side of the first inner core 13.

Each of the first inner core 13 and the second inner core 14 is formed by winding a bead wire G spirally in the circumferential direction more than once. The inner core 10 of this embodiment is made of a wound body of the bead wire G axially aligned to make two rows. Thus, when the inner core 10 is made of a plurality of rows of the bead wire G, the number of turns of the bead wire G of the inner core 10 is defined as a sum of the number of turns (five in the present embodiment) of the bead wire G of the first inner core 13 and the number of turns (eleven in the present embodiment) of the bead wire G of the second inner core 14.

In a bending deformation state of the bead portion 4 of FIG. 6, the carcass ply 6A acts as a substantially neutral axis of the bending deformation, and from there, a larger compressive stress acts more on a more axially inner side. In the present embodiment, in view of such effect, the number of turns of the bead wire G of the second inner core 14 is set larger than the number of turns of the bead wire G of the first inner core 13. Thus, since the second inner core 14 has higher compressive resistance rigidity than that of the first inner core 13, the compression deformation can be suppressed more effectively, therefore the rim-off resistance can be further enhanced.

In a preferred embodiment, as shown in FIG. 4, an outer diameter D4 of the second inner core 14 is formed larger than an outer diameter D2 of the first inner core 13. Thus, in a state of the bending deformation of the bead portion 4, the second inner core 14 functions as a so-called supporting bar, and can suppress the compressive deformation of the bead portion 4 more effectively. In order to more effectively exhibit such functions, an inner diameter D3 of the second inner core 14 is preferably formed smaller than an inner diameter D1 of the first inner core 13. Thus, the second inner core 14 supports entirely the first inner core 13 from the axial inside, and the inner core 10 as a whole can have a higher compressive resistance rigidity.

The second inner core 14 of the present embodiment includes a main portion 14a extending along an axially inner side of the first inner core 13, an auxiliary portion 14b extending along the carcass ply 6A without intervening the first inner core 13, and a bent joint portion 14c connecting the main portion 14a and the auxiliary portion 14b so as to cover a radially outer surface of the first inner core 13. Such a second inner core 14 cooperates with the adjacent outer core 11 through the carcass ply 6A, and the compressive resistance rigidity of the inner core 10 can be more improved. In particular, when the bead portion 4 is subjected to the moment M shown in FIG. 4, the joint portion 14c is in contact with a radially outer end of the first inner core 13, and higher compressive resistance rigidity can be exhibited.

In a more preferred embodiment, an axial distance W from an axially inner end of the inner core 10 to an inner cavity surface S is preferably not less than 2.5 mm. In other words, a rubber having the same thickness as this distance W is provided on an axially inner side of the inner core 10. Since the rubber has large compressive resistance rigidity, due to a synergistic effect of a structure of the inner core 10, the rim-off resistance can be further enhanced.

The outer core 11 includes a first outer core 16 disposed on a side of the carcass ply 6A, and a second outer core 17 disposed on axially outward of the first outer core 16. Each of the first outer core 16 and the second outer core 17 is formed by winding a bead wire G spirally in the circumferential direction more than once. That is to say, the outer core 11 of this embodiment is made of a wound body of the bead wire G axially aligned to make two rows. Thus, when the outer core 11 is made of a plurality of rows of the bead wire G, the number of turns of the bead wire G of the outer core 11 is defined as a sum of the number of turns (nine in the present embodiment) of the bead wire G of the first outer core 16 and the number of turns (five in the present embodiment) of the bead wire G of the second outer core 17.

The number of turns of the bead wire G of the first outer core 16 is preferably set larger than the number of turns of the bead wire G of the second outer core 17, for example. This serves to suppress effectively the axially outward bending deformation of the bead portion direction at the time of ordinal running or cornering of the tire 100 with a proper internal pressure.

An outer diameter D6 of the first outer core 16 is preferably formed larger than an outer diameter D8 of the second outer core 17, for example. Accordingly, the axially outward bending deformation of the bead portion can be effectively suppressed. To enhance this effect further effectively, an inner diameter D5 of the first outer core 16 is preferably smaller than the inner diameter D7 of the second outer core 17, for example.

The outer diameter D4 of the second inner core 14 is preferably larger than the outer diameter D6 of the first outer core 16. Thus, the rim-off resistance can be enhanced while maintaining the ride comfort during cornering.

The inner diameter D1 of the first inner core 13 and the inner diameter D5 of the first outer core 16 are preferably the same, for example. Accordingly, on a radially inner side between the second inner core 14 and the second outer core 17, a radially inner surface is continuously formed. Such a radially inner surface serves to further improve the rim-off resistance. Also, since the bead wire G of the first inner core 13 and the bead wire G of the first outer core 16 are opposed to each other, the carcass ply 6A is held strongly, therefore the omission of the carcass ply 6A can be further suppressed.

As shown in FIG. 5, in a state where the internal pressure of the tire 100 is decreased, a vicinity of the tire equator C of the tread portion 2 is separated from the road surface R, that is, buckling occurs. The above-mentioned moment M tends to increase in proportion to the amount of the buckling. To reduce the buckling, a maximum thickness (t) of a center portion of the side reinforcing rubber layer 9 (illustrated in FIG. 1) is preferably not less than 6.0 mm, more preferably not less than 7.0 mm. Owing to this side-reinforcing rubber layer 9, the moment M is suppressed, and the rim-off resistance can be further improved.

The above has described in detail particularly preferred embodiments of the present invention, the present invention is not limited to these embodiments, may be embodied upon modifying the same into various forms.

EXAMPLE

First Embodiment

A pneumatic tire of size 245/45R18 having a basic structure shown in FIG. 1 was made based on specifications shown in Table 1. A durability of a bead portion and a run-flat durability were tested.

Durability of Bead Portion

Each test tire was assembled on a rim 18×8.0 J was run on a test drum having a diameter 1.7 m while applying a large load to the bead portion under conditions of an internal pressure 360 kPa, a load 13.12 kN, a speed of 80 km/h. A mileage was measured until the bead portion was damaged. The test result was indicated by an index that the mileage of Example 1 being 100. The larger the value is, the higher and better the durability of the bead portion is.

Run-Flat Durability

Each test tire was assembled on a rim 18×8.0 J was run on a test drum having a diameter 1.7 m under conditions of an internal pressure 0 kPa, a load 4.53 kN, a speed of 80 km/h. A mileage was measured until the tire sounded an abnormal noise. The test result was indicated by an actual mileage. The larger the value is, the higher and better the run-flat durability is.

TABLE 1

|  | Ref. Ex. 1 | Ref. Ex. 2 | Ex. 1 | Ex. 2 | Ex. 3 | Ex. 4 | Ex. 5 | Ex. 6 | Ex. 7 |
|---|---|---|---|---|---|---|---|---|---|
| Ho/Hi (%) | 100 | 200 | 130 | 120 | 150 | 130 | 130 | 130 | 130 |
| Side reinforcing rubber layer | Absence | Absence | Absence | Absence | Absence | Presence | Presence | Presence | Presence |
| Height of outer end of clinch rubber relative outer end of outer bead apex rubber | High | High | High | High | High | High | Low | High | High |
| Ta/Tz (%) | 0 | 0 | 0 | 0 | 0 | 27.5 | 27.5 | 5 | 17.5 |
| Tb/Tz (%) | 10 | 30 | 20 | 10 | 25 | 10 | 20 | 25 | 15 |
| Tc/Tz (%) | 46 | 50 | 55 | 55 | 50 | 46 | 35 | 53 | 50 |
| Td/Tz (%) | 22 | 0 | 0 | 10 | 0 | 0 | 0 | 0 | 0 |
| Durability of bead portion (index) | 75 | 75 | 100 | 95 | 95 | 85 | 80 | 90 | 88 |
| Run-flat durability (km) | 10 | 10 | 15 | 12 | 12 | 140 | 100 | 20 | 60 |

|  | Ex. 8 | Ex. 9 | Ex. 10 | Ex. 11 | Ex. 12 | Ex. 13 | Ex. 14 | Ex. 15 |
|---|---|---|---|---|---|---|---|---|
| Ho/Hi (%) | 130 | 130 | 130 | 130 | 130 | 130 | 130 | 130 |
| Side reinforcing rubber layer | Presence | Presence | Presence | Presence | Presence | Presence | Presence | Presence |
| Height of outer end of clinch rubber relative outer end of outer bead apex rubber | High | High | High | High | High | High | High | High |
| Ta/Tz (%) | 37.5 | 40 | 37.5 | 37.5 | 20 | 17.5 | 22.5 | 17.5 |
| Tb/Tz (%) | 5 | 3 | 20 | 30 | 8 | 6 | 10 | 10 |
| Tc/Tz (%) | 40 | 40 | 36 | 26 | 56 | 60 | 40 | 36 |
| Td/Tz (%) | 0 | 0 | 0 | 0 | 0 | 0 | 10 | 20 |
| Durability of bead portion (index) | 83 | 80 | 83 | 80 | 85 | 83 | 83 | 80 |
| Run-flat durability (km) | 150 | 155 | 140 | 140 | 80 | 60 | 90 | 50 |

As is clear from Table 1, in the pneumatic tire of Examples, it was confirmed that the durability of the bead portion and the run-flat durability were significantly improved as compared with Comparative Examples.

Second Embodiment

A tire of (size: 245/45RF18 96Y) having a basic structure shown in FIG. 3 was made based on the specifications shown in Table 2. Its performance was tested.

A test method is as follows.

Rim-Off Resistance

Each test tire was assembled on a rim (8.0×18) without a valve core and mounted on one of front wheels of a test vehicle in a punctured state having an internal pressure of zero (gauge pressure). The vehicle was run on a wet road surface with water film while keeping a handle was fully locked. After running at a speed of 30 km/h, a rim-off of the tire was visually confirmed. After repeating the above-mentioned test six times per test tire, evaluations were conducted by a ten-point method based on the number of times that the rim-off were confirmed. The larger the value is, the better the rim-off resistance is.

TABLE 2

|  | Ref. Ex. 1 | Ref. Ex. 2 | Ex. 1 | Ex. 2 | Ex. 3 | Ex. 4 | Ex. 5 | Ex. 6 | Ex. 7 | Ex. 8 |
|---|---|---|---|---|---|---|---|---|---|---|
| Number of turns of inner core (times) | 9 | 12 | 12 | 16 | 12 | 16 | 12 | 12 | 12 | 12 |
| Number of turns of first inner core (times) | 1 | 4 | 4 | 6 | 4 | 6 | 4 | 4 | 4 | 4 |
| Number of turns of second inner core (times) | 8 | 8 | 8 | 10 | 8 | 10 | 8 | 8 | 8 | 8 |
| Number of turns of outer core (times) | 11 | 13 | 11 | 11 | 9 | 15 | 11 | 11 | 11 | 11 |
| Number of turns of first outer core (times) | 7 | 8 | 0 | 7 | 6 | 9 | 7 | 7 | 7 | 7 |
| Number of turns of second outer core (times) | 4 | 5 | 4 | 4 | 3 | 6 | 4 | 4 | 4 | 4 |
| Inner diameter of second inner core related to inner diameter of first inner core | Small | Small | Small | Small | Small | Small | Large | Small | Small | Small |
| Inner diameter of first outer core related to inner diameter of first inner core | Equivalent | Equivalent | Equivalent | Equivalent | Equivalent | Equivalent | Equivalent | Equivalent | Equivalent | Equivalent |
| Inner diameter of second outer core related to inner diameter of first outer core | Large | Large | Large | Large | Large | Large | Small | Large | Large | Large |

TABLE 2-continued

|  | Ref. Ex. 1 | Ref. Ex. 2 | Ex. 1 | Ex. 2 | Ex. 3 | Ex. 4 | Ex. 5 | Ex. 6 | Ex. 7 | Ex. 8 |
|---|---|---|---|---|---|---|---|---|---|---|
| Tire axial distance W (mm) | 3 | 3 | 3 | 3 | 3 | 3 | 3 | 2 | 2.5 | 7.5 |
| Rim-off resistance (Ten-point method) | 2 | 2 | 8 | 8 | 7 | 8 | 5 | 5 | 6 | 8 |

As shown in Table 2, in the tire of each Example, it was confirmed that the rim-off resistance could be exhibited well.

DESCRIPTION OF REFERENCES

1 Pneumatic tire
3 sidewall portion
3G sidewall rubber
4 Bead portion
4G clinch
5 Bead core
10 Inner core
11 outer core
6 Carcass
6A carcass ply
8 Bead apex rubber
8i Inner bead apex rubber
8o outer bead apex rubber
10 side reinforcing rubber layer
Hi Inner apex height
Ho Outer apex height
G Bead wire

The invention claimed is:

1. A pneumatic tire comprising:
a carcass formed of a carcass ply extending between a pair of bead portions in a toroidal shape;
a side reinforcing rubber layer having a substantially crescentic cross-sectional shape, the side reinforcing rubber layer disposed on an inner side of the carcass in a sidewall region;
a bead core disposed in a respective one of the bead portions, the bead core comprising an axially inner core and an axially outer core respectively disposed on an axially inner side and the axially outer side of the carcass ply;
an inner bead apex rubber extending radially outward from the inner core in a tapered shape;
an outer bead apex rubber extending radially outward from the outer core in a tapered shape;
a clinch rubber disposed on an axially outer side of the outer bead apex rubber of one of the bead portions to form an outer surface of the bead portion and a radially outer end of the clinch rubber being located radially outside an outer end of the outer bead apex rubber; and
a sidewall rubber disposed axially outward of the carcass and the clinch rubber to form an outer surface of a sidewall portion;
wherein a thickness (Ta) of the side reinforcing rubber layer at a radially inner end of the sidewall rubber is in a range of from 17.5% to 37.5% of a thickness (Tz) of the bead portion at the inner end of the sidewall rubber;
wherein a thickness (Tc) of the clinch rubber at the inner end of the sidewall rubber is in a range of from 36% to 56% of the thickness (Tz) of the bead portion;
wherein an outer apex height Ho, which is a radial distance from a bead base line to a radially outer end of the outer bead apex rubber, is in a range of from 120% to 150% of an inner apex height Hi, which is a radial distance from the bead base line to the radially outer end of the inner bead apex rubber; and
wherein each of the inner core and the outer core is formed by winding a bead wire spirally in a circumferential direction of the tire more than once, and in at least one of the bead portions, the number of turns of the bead wire of the inner core is larger than the number of turns of the bead wire of the outer core.

2. The pneumatic tire according to claim 1,
wherein a thickness (Tb) of the outer bead apex rubber at the inner end of the sidewall rubber is not more than 20% of the thickness (Tz) of the bead portion.

3. The pneumatic tire according to claim 2,
wherein a thickness (Td) of the inner bead apex rubber at the inner end of the sidewall rubber is not more than 10% of the thickness (Tz) of the bead portion.

4. The pneumatic tire according to claim 1,
wherein a thickness (Td) of the inner bead apex rubber at the inner end of the sidewall rubber is not more than 10% of the thickness (Tz) of the bead portion.

5. The pneumatic tire according to claim 1,
wherein the inner core comprises a first inner core disposed on a carcass ply side, and a second inner core disposed on an axially inward of the first inner core, and the number of turns of the bead wire of the second inner core is larger than the number of turns of the bead wire of the first inner core.

6. The pneumatic tire according to claim 5,
wherein an outer diameter of the second inner core is larger than an outer diameter of the first inner core.

7. The pneumatic tire according to claim 5,
wherein an inner diameter of the second inner core is smaller than an inner diameter of the first inner core.

8. The pneumatic tire according to claim 5,
wherein the second inner core comprises a main portion extending along an axially inner side of the first inner core, an auxiliary portion extending along the carcass ply without intervening the first inner core and a bent joint portion connecting the main portion to the auxiliary portion so as to cover a radially outer surface of the first inner core.

9. The pneumatic tire according to claim 1,
wherein the outer core comprises a first outer core disposed on a carcass ply side and a second outer core disposed on axially outward of the first outer core, and the number of turns of the bead wire of the first outer core is larger than the number of turns of the bead wire of the second outer core.

10. The pneumatic tire according to claim 9,
wherein an outer diameter of the first outer core is larger than an outer diameter of the second outer core.

11. The pneumatic tire according to claim 9,
wherein an inner diameter of the first outer core is smaller than an inner diameter of the second outer core.

12. The pneumatic tire according to claim 1,
wherein an axial distance from an axially inner end of the inner core to a tire inner cavity surface is not less than 2.5 mm.

13. The pneumatic tire according to claim 1,
wherein the carcass ply terminates radially inward of the bead core.

* * * * *